United States Patent [19]

Matsunaga et al.

[11] 4,226,748
[45] Oct. 7, 1980

[54] FABRIC SIZING EMULSION

[75] Inventors: Kinjiro Matsunaga, Saitama; Shin-ichi Masuda, Ichikawa; Yunosuke Nakagawa, Soka; Naotake Takaishi, Sakura, all of Japan

[73] Assignee: Kao Soap Co., Ltd., Tokyo, Japan

[21] Appl. No.: 4,999

[22] Filed: Jan. 22, 1979

[30] Foreign Application Priority Data

Jan. 27, 1978 [JP] Japan .................................. 53-8053

[51] Int. Cl.$^3$ ............................................. C08L 1/28
[52] U.S. Cl. ...................... 260/17 A; 260/17.4 GC; 260/17.4 CL; 260/17.4 ST; 526/910; 526/911
[58] Field of Search ............... 260/17.4 GC, 17.4 CL, 260/17.4 ST, 17 A

[56] References Cited

U.S. PATENT DOCUMENTS

| 3,954,687 | 5/1976 | Wiest et al. | 260/17 A |
| 4,139,509 | 2/1979 | Matsunaga et al. | 260/17.4 ST |

FOREIGN PATENT DOCUMENTS 1148060  4/1969  United Kingdom ........... 260/29.6 RW Primary Examiner—Edward M. Woodberry
Attorney, Agent, or Firm—Blanchard, Flynn, Thiel, Boutell & Tanis

[57] ABSTRACT

A fabric sizing emulson composition is obtained by emulsion polymerization of a vinyl monomer in the presence of a cationic polymer and a non-ionic water-soluble polymer, the resulting vinyl polymer having a cationic nitrogen content of 0.004 to 0.2% by weight based on the vinyl polymer. The obtained sizing agent is used by diluting it with water to a relatively large extent.

19 Claims, No Drawings

FABRIC SIZING EMULSION

The present invention relates to a fabric sizing agent. More particularly, the invention relates to a household sizing agent which can impart a proper stiffness to clothes when the clothes are continuously or discontinuously exposed to an agitating force in a solution of said sizing agent at a high bath ratio.

Starch has heretofore been used as a household sizing agent, and various improvements have been made to render starch much easier to use. A stable liquid sizing agent which can easily be diluted and can be used very simply and conveniently has been developed. For example, a composition formed by adding a defoaming agent, a mold-proofing agent, a fluorescent whitening agent, a perfume and so on to a 10 to 15% aqueous solution of carboxymethyl cellulose, starch, polyvinyl alcohol or the like is used. When such sizing agent is actually used, water is charged in a vessel, the sizing agent is dispersed or dissolved in the water and a cloth is dipped in the dispersion or solution and allowed to stand still to effect starching. Ordinarily, the amount of water used is about 1 to about 3 times the weight of the cloth. When the amount of water is increased, the sizing agent is used wastefully and the increase of the amount of water is disadvantageous from the economical viewpoint.

The required degree of sizing or starching differs according to various kinds of clothes. For example, a sharp stiffness is required for sheets and quilt covers. On the other hand, in the case of shirts and blouses, collar and cuffs portions should be sized stiffly but body portions should be sized softly. At the present, wash-and-wear type shirts and blouses of polyester/cotton blends are broadly used in ordinary households, and collar and cuffs portions of these clothes are sized by spraying an aerosol sizing agent after washing. Accordingly, the post treatment of the washed clothes is very troublesome. Therefore, development of a sizing agent capable of providing an appropriate sizing effect during washing has been desired in the art, but no satisfactory sizing agent has been developed.

It is a primary object of the present invention to provide a sizing agent capable of imparting an appropriate stiffness to clothes such as shirts and blouses, especially those of the wash-and-wear type, during washing.

More specifically, in accordance with the present invention, there is provided a fabric sizing emulsion composition which comprises a vinyl polymer obtained by emulsion polymerization conducted in the presence of a cationic polymer and a non-ionic water-soluble polymer, said vinyl polymer having a cationic nitrogen content of 0.004 to 0.2% by weight based on the vinyl polymer.

Water is used in an amount 10 to 100 times, preferably 15 to 40 times, the amount of a cloth, and the sizing agent of the present invention is added in an amount of 0.2 to 3% by weight, preferably 0.4 to 2% by weight, based on the cloth and by imparting an agitating movement continuously or discontinuously, the sizing agent is stuck in the cloth, whereby an appropriate stiffness can be imparted to the cloth.

The vinyl polymer that is used in the present invention is prepared by emulsion polymerizing a vinyl monomer in an aqueous solution of a non-ionic water-soluble polymer in the presence of a cationic polymer.

As the non-ionic water-soluble polymer, there can be mentioned, for example, polyvinyl alcohol obtained by saponifying polyvinyl acetate at a degree of saponification of 70 to 100%, modified starch such as hydroxyethylated starch and hydroxypropylated starch and a cellulose derivative such as hydroxyethyl cellulose or hydroxypropyl cellulose. It is preferred that the viscosity of a 1% aqueous solution of such non-ionic water-soluble polymer be 3 to 500 centipoises (hereinafter referred to as "cps"), especially 5 to 100 cps.

As the cationic polymer that is used in the present invention, there can be mentioned, for example, cationic cellulose and cationic starch (those that are water-soluble and contain a quaternary ammonium cationic group as the cationic group are especially preferred), and cationic vinyl polymers.

As cationic starch or cationic cellulose, there are preferably employed those represented by the following formula (1):

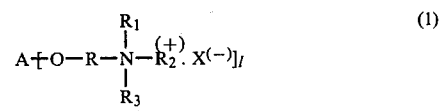

wherein A stands for a starch or cellulose residue, R stands for an alkylene or hydroxyalkylene group, $R_1$, $R_2$ and $R_3$, which may be the same or different, stand for an alkyl, aryl or aralkyl group or they may form a heterocyclic ring together with the nitrogen atom in the formula, X stands for an anion (such as chlorine, bromine, iodine, sulfuric acid, sulfonic acid, methylsulfuric acid, phosphoric acid or nitric acid), and l is a positive integer.

It is preferred that the degree of cation substitution be 0.01 to 1, especially 0.02 to 0.5, in the cationic starch or cationic cellulose. In other words, it is preferred that 0.01 to 1 cationic group, especially 0.02 to 0.5 cationic group, be introduced per anhydroglucose unit. If the degree of substitution is lower than 0.01, no satisfactory results are obtained. No particular disadvantage is brought about when the degree of substitution exceeds 1, but from the viewpoint of the reaction yield, a degree of substitution not exceeding 1 is preferred.

As the cationic vinyl polymer, there can be mentioned those represented by the following formulae (2) to (4):

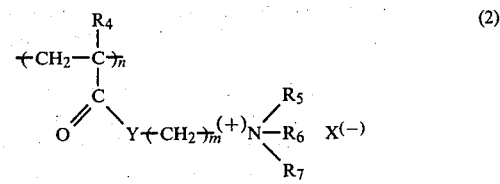

wherein $R_4$ stands for a hydrogen atom or a methyl group, $R_5$, $R_6$ and $R_7$, which may be the same or different, stand for a hydrogen atom or an alkyl or substituted alkyl group having 1 to 4 carbon atoms, Y stands for an oxygen atom or a group —NH in the amide linkage, X is as defined above in the formula (1), and m is an integer of 1 to 10,

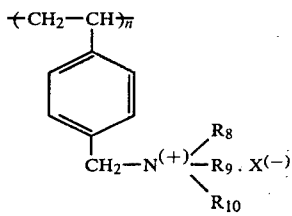

(3)

wherein $R_8$, $R_9$ and $R_{10}$, which may be the same or different, stand for a hydrogen atom or an alkyl or substituted alkyl group having 1 to 2 carbon atoms, and X is as defined above in the formula (1), and

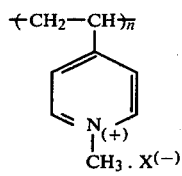

(4)

wherein X is as defined above in the formula (1).

It is preferred that the viscosity of a 1% aqueous solution of the cationic polymer be 5 to 1000 cps, especially 10 to 500 cps, as measured at 20° C. In preparing the vinyl polymer of the present invention, the cationic polymer is added in an amount of 0.01 to 5% by weight, preferably 0.2 to 3% by weight, based on the entire emulsion.

The content of the cationic nitrogen atom originating from the cationic polymer contained in the vinyl polymer is 0.004 to 0.2% by weight, preferably 0.01 to 0.15% by weight, based on the vinyl polymer. If the content of the cationic nitrogen atom is lower than 0.004% by weight, no sufficient effect can be obtained, and when the content of the cationic nitrogen atom is higher than 0.2% by weight, the attained effect is satisfactory but discoloration of the vinyl polymer is caused and economical disadvantages are brought about.

Vinyl acetate is most preferred as the vinyl monomer to be used for formation of the vinyl polymer of the present invention. In addition, there can be used lower fatty acid vinyl esters such as vinyl butyrate and vinyl propionate, acrylic acid esters such as methyl acrylate, ethyl acrylate and butyl acrylate, and methacrylic acid esters such as methyl methacrylate, ethyl methacrylate and butyl methacrylate. Further, monomers copolymerizable with such vinyl monomer, for example, styrene and ethylene, can be used in combination.

The amount used of the monomer is 20 to 60% by weight, preferably 25 to 50% by weight, based on the final emulsion.

When the vinyl polymer of the present invention is prepared, a non-ionic surface active agent may be added as an emulsifier according to need. As typical instances of such non-ionic surface active agent, there can be mentioned polyoxyethylene alkyl ethers, polyoxyethylene alkylphenyl ethers and polyoxyethylene sorbitan fatty acid esters. It is preferred that the HLB value of such non-ionic surface active agent be at least 11, especially 13 to 18.

2,2'-Azobis(2-amidinopropane) is most preferred as the polymerization initiator to be used for the production of the vinyl polymer of the present invention. In addition, there can be used, for example, hydrogen peroxide, t-butyl hydroperozide, cumene hydroperoxide, t-butyl peroxide, methylethyl ketone peroxide, cyclohexanone peroxide, peracetic acid and perbenzoic acid. It is preferred that the polymerization initiator be used in an amount of 0.01 to 5.0% by weight based on the vinyl monomer.

The reaction temperature to be adopted for the production of the vinyl polymer of the present invention is 40° to 120° C., preferably 50° to 90° C. The pH adopted at the polymerization is 3 to 9, preferably 4 to 8. As the pH buffer agent, there can be used inorganic salts such as sodium carbonate, sodium bicarbonate, sodium orthophosphate, secondary sodium phosphate, primary sodium phosphate, sodium chloride and sodium sulfate, and organic acid salts such as sodium acetate. The pH buffer agent is incorporated in an amount of 0.05 to 2% by weight, preferably 0.1 to 1% by weight.

The sizing agent may further comprise ordinary additives for polymer emulsions according to need. For example, the sizing agent may comprise a plasticizer such as dibutyl phthalate, dibutyl adipate, dioctyl adipate or triacetin, an antifreezing agent such as ethylene glycol, propylene glycol or ethanol, a perfume, a fungicide, an antiseptic, a fluorescent dye and a pigment.

The sizing agent of the present invention may be applied to a customary sizing method in which the ratio of the amount of the cloth to the amount of water diluting the sizing composition, namely the bath ratio, is in the range of from 1:1 to 1:4. However, when the sizing agent of the present invention is employed, especially good results are obtained if the bath ratio is from 1:10 to 1:100, preferably from 1:15 to 1:40. Such increase of the bath ratio ensures uniform starching. Further, in case of household application, if a strong agitating power is continuously given by an electric washing machine and the sizing operation is carried out while an aqueous solution of the sizing agent is sufficiently shaken and fluidized, there can be attained an effect that the sizing agent is sufficiently absorbed in a thick cloth but is not sufficiently absorbed in a thin cloth. Accordingly, the sizing agent is sufficiently absorbed in thick fibrous articles such as sheets, and in case of clothes such as shirts and blouses, the amount of the sizing agent absorbed in an unlined portion such as a body portion is smaller than the amount of the sizing agent absorbed in a lined or cored portion such as a collar or cuffs portion. As a result, there can be attained a sizing effect excellent over the sizing effect attainable by conventional sizing agents. This excellent finish effect cannot be attained by any of conventional non-ionic and anionic sizing agents, and increase of the bath ratio or application of an agitating power is of no significance in case of conventional sizing agents. The agitating power to be applied when the sizing agent of the present invention is used may be such that an aqueous solution of the sizing agent is continuously or discontinuously agitated by a mechanical force. Therefore, when the sizing agent of the present invention is used in ordinary households, good results are obtained if washing machines of the pulsator, agitator or tumbler type are employed.

When the sizing operation is carried out by using the sizing agent of the present invention, the amount applied of the effective component of the sizing agent (the amount of the solid component) is 0.2 to 3% by weight, preferably 0.4 to 2% by weight, based on the weight of a cloth.

The present invention will now be described in detail by reference to the following Examples that by no means limit the scope of the invention. In these Examples, all of "parts" are by weight.

EXAMPLE 1

[Synthesis of Vinyl Polymer]

A 5-neck separable flask equipped with a thermometer, a reflux cooler, a nitrogen-introducing device and a metering dropping device was charged with x parts of polyvinyl alcohol (completely saponified; polymerization degree=1800) and 130 parts of deionized water, and the polymer was dissolved in water at 80° C. and the solution was cooled to 40° C. Then, y parts of trimethylaminohydroxypropylated starch

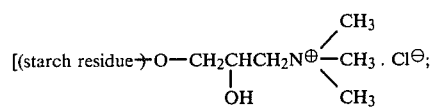

cation degree of substitution (the mean value of the number of cationic groups introduced per unit of anhydrous glucose)=0.30; viscosity of 1% aqueous solution=30 cps], 0.5 part of polyoxyethylene dodecyl ether (average mole number of added ethylene oxide=30) and an aqueous solution of sodium carbonate consisting of 1 part of sodium carbonate and 10 parts of deionized water were added to the above solution. Air in the flask was replaced by nitrogen. Then, 10 parts of monomeric vinyl acetate was added and a polymerization initiator consisting of 0.1 part of 2,2'-azobis(2-amidinopropane) hydrochloride and 10 parts of deionized water was further added. The temperature was elevated to 70° C. to initiate polymerization. Over a period of 100 minutes from the point of 10 minutes after initiation of polymerization, 90 parts of monomeric vinyl acetate was continuously added. After completion of the continuous addition, aging was conducted at 80° C. for 1 hour. Thus, the emulsion polymerization was completed.

[Preparation of Sizing Agent]

To 90 parts of the emulsion synthesized above were added 2 parts of dibutyl adipate, 4 parts of ethanol, 0.5 part of a silicone emulsion (1000 centistokes; 30% emulsion of silicone oil) and 3.5 parts of deionized water to form a sizing agent.

[Sizing Test]

In a Terg-O-Tometer type washing tester, the sizing agent was added to 1000 ml of deionized water in an amount of 0.6 g as the effective component and the sizing agent was sufficiently dispersed in water. Then, 50 g of a cotton cloth (#60) was added and agitation was carried out at 100 rpm for 3 minutes to effect starching. The cotton cloth was dehydrated for 30 seconds in a dehydrator (dehydrating tank of a National washing machine), air-dried, iron-pressed at 130° C. for 1 minute and allowed to stand still for 1 day in a thermostat chamber maintained at a temperature of 20° C. and a relative humidity of 65%. The starching stiffness was measured according to the cantilever method of JIS 1005-1959 (a larger value indicates a higher stiffness).

Results obtained by making the above test on various sizing agents synthesized by changing the amounts of the polyvinyl alcohol and trimethylaminohydroxypropylated starch are shown in Table 1.

TABLE 1

| Sample | Amount (x parts) of Polyvinyl Alcohol | Amount (y parts) of Cationic Starch | Amount (%) of Cationic Starch in Total Emulsion | Amount (%) of Quarternary Cationic Nitrogen based on total solids | Amount (%) of Quarternary Cationic Nitrogen based on emulsion | Starching Stiffness (cm) |
|---|---|---|---|---|---|---|
| A | 8.5 | 0 | 0 | 0 | 0 | 5.2 |
| B | 8.0 | 0.5 | 0.19 | 0.0091 | 0.0038 | 5.5 |
| C | 7.5 | 1.0 | 0.38 | 0.018 | 0.0076 | 5.9 |
| D | 7.0 | 1.5 | 0.58 | 0.027 | 0.012 | 6.5 |
| E | 6.5 | 2.0 | 0.77 | 0.036 | 0.015 | 7.2 |
| F | 6.0 | 2.5 | 0.96 | 0.045 | 0.019 | 7.4 |
| G | 5.0 | 3.5 | 1.35 | 0.064 | 0.027 | 7.7 |
| H | 4.0 | 4.5 | 1.73 | 0.082 | 0.035 | 7.8 |
| I | 3.0 | 5.5 | 2.12 | 0.10 | 0.042 | 7.8 |
| J | 2.0 | 6.5 | 2.50 | 0.12 | 0.050 | 7.8 |

In case of the sizing agent composition A, which is outside the scope of the present invention, even when the amount of the effective component of the sizing agent was trebled, namely increased to 1.8 g, and the starching treatment was similarly carried out, the starching stiffness was only increased to 6.2 cm.

EXAMPLE 2

A 5-neck separable flask equipped with a thermometer, an agitator, a reflux cooler, a nitrogen-introducing device and a metering dropping device was charged with 5.2 parts of polyvinyl alcohol (completely saponified; polymerization degree=1800) and 130 parts of deionized water. The polyvinyl alcohol was dissolved in water at 80° C. and the solution was cooled to 40° C. Then, 7.8 parts of dimethylaminohydroxypropylated starch

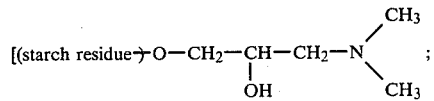

cation degree of substitution (the mean value of the number of cationic groups introduced per unit of anhydrous glucose)=0.6; viscosity of 1% aqueous solution=30 cps] or trimethylaminohydroxyethylated starch

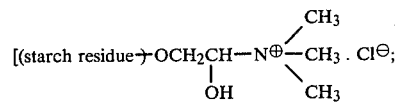

cation degree of substitution=0.6; viscosity of 1% aqueous solution=35 cps], 0.5 part of polyoxyethylene stearyl ether (average mole number of added ethylene oxide=25) and an aqueous solution consisting of 1 part of sodium carbonate and 10 parts of deionized water were added to the above solution. Air in the flask was replaced by nitrogen. Then, 10 parts of monomeric vinyl acetate and a polymerization initiator consisting of 0.1 part of 2,2'-azobis(2-amidinopropane) hydrochloride and 10 parts of deionized water were added, and the temperature was elevated to 70° C. to initiate polymerization. Over a period of 100 minutes from the point of 10 minutes after initiation of polymerization, 90 parts of monomeric vinyl acetate was continuously added. After completion of the continuous addition, aging was carried out at 80° C. for 1 hour to complete the emulsion polymerixation reaction.

To 90 parts of the so formed emulsion were added 2 parts of dibutyl adipate, 4 parts of ethanol, 0.5 part of a silicone emulsion (30% emulsion of silicone oil of 10000 centistokes) and 3.5 parts of deionized water to form a sizing agent.

The so obtained sizing agent was stored at −10° to 5° C. (allowed to stand at −10° C. for 12 hours and at 5° C. for 12 hours; one cycle temperature change=48 hours) or at 40° C. for 1 month. In the case of the sizing agent of the present invention including trimethylaminohydroxyethylated starch, no change was caused, but in the case of the sizing agent including dimethylaminohydroxypropylated starch, the separation into two phases appeared in each of the two tests.

EXAMPLE 3

The sizing agent of the present invention (sample J in Example 1) was compared with a commercially available non-ionic polyvinyl acetate emulsion type sizing agent. Namely, a cotton fabric (#60) was treated in the same manner as in Example 1 and the starching stiffness was determined in the same manner as in Example 1 to obtain results shown in Table 2.

TABLE 2

|  | Content (%) of Effective Component | | | |
| --- | --- | --- | --- | --- |
|  | 0.03 | 0.05 | 0.1 | 0.2 |
| Sample J | 6.6 cm | 7.6 cm | 8.7 cm | 9.9 cm |
| Non-ionic commercially available product | 4.9 cm | 5.2 cm | 5.6 cm | 6.1 cm |

EXAMPLE 4

In the same reaction vessel as used in Example 1, 8 parts of polyvinyl alcohol (degree of saponification of polyvinyl acetate=78.5%; polymerization degree=1600) was dissolved at 80° C. in 130 parts of deionized water, and the solution was cooled to 40° C. Then, 0.3 part of cationic cellulose [JR-400 manufactured by Union Carbide Corporation; hydroxyethyl degree of substitution (the mean value of the number of hydroxyethyl groups introduced per unit of anhydrous glucose)=1.6 to 2.1; cation degree of substitution=0.35 to 0.45; nitrogen content=1.7 to 2.2%], 0.8 part of polyoxyethylene nonylphenyl ether (average mole number of added ethylene oxide=20) and an aqueous solution of sodium carbonate consisting of 0.5 part of sodium carbonate and 5 parts of deionized water were added to the above solution. Air in the flask was replaced by nitrogen. Then, 10 parts of monomeric vinyl acetate and a polymerization initiator consisting of 0.1 part of 2,2′-azobis(2-amidinopropane) hydrochloride and 10 parts of deionized water were added, and the temperature was elevated to 70° C. to initiate polymerization. Over a period of 100 minutes from the point of 10 minutes after initiation of polymerization, 90 parts of monomeric vinyl acetate was continuously added. After completion of the continuous addition, aging was carried out at 80° C. for 1 hour to complete the emulsion polymerization reaction. In the resulting emulsion, the solid content was 42.4% and the particle size was about 0.5 to about 1.0μ.

To 91 parts of the so obtained emulsion were added 2 parts of dibutyl phthalate, 3 parts of ethanol, 2 parts of propylene glycol, 0.5 part of a silicone emulsion (30% emulsion of silicone oil of 10000 centistokes) and 1.5 parts of deionized water to obtain a sizing agent. It was found that the product had valuable properties as the sizing agent to be used for the sizing treatment using a washing machine.

EXAMPLE 5

In a 5-neck separable flask equipped with a thermometer, an agitator, a reflux cooler, a nitrogen-introducing device and a metering dropping device, 8 parts of polyvinyl alcohol (completely saponified; polymerization degree=1800) was dissolved in 130 parts of deionized water at 80° C. The solution was cooled to 40° C. Then, 0.5 part of trimethylaminopropylated starch (degree of substitution=0.5, viscosity of 1% aqueous solution=45 cps), 0.5 part of polyoxyethylene stearyl ether (average mole number of added ethylene oxide=25) and an aqueous solution consisting of 1 part of sodium carbonate and 10 parts of deionized water were added to the above solution. Air in the flask was replaced by nitrogen. Then, 10 parts of monomeric vinyl acetate, 0.1 part of 2,2′-azobis(2-amidinopropane) hydrochloride and 10 parts of deionized solution were added, and the temperature was elevated to 70° C. to initiate polymerization. Over a period of 100 minutes from the point of 10 minutes after initiation of polymerization, 90 parts of monomeric vinyl acetate was continuously added. After completion of the continuous addition, aging was carried out at 80° C. for 1 hour to complete the emulsion polymerization reaction. As a result of observation under an optical microscope, it was found that the average particle size of the emulsion was about 0.7μ. The solid content in the emulsion was 44.9%.

To 90 parts of the so obtained emulsion were added 2 parts of dibutyl adipate, 4 parts of ethanol, 0.5 part of a silicone emulsion (30% emulsion of silicone oil of 10000 centistokes) and 3.5 parts of deionized water to obtain a sizing agent.

When this sizing agent was used for the sizing treatment using a washing machine, good results were obtained. More specifically, an appropriate high stiffness was given to sheets and quilt covers, and in case of shirts and blouses, a relatively soft touch was given to a body portion and a stiff touch was given to a collar or cuffs portion.

The embodiments of the invention of which an exclusive property or priviledge is claimed are defined as follows:

1. A fabric sizing emulsion prepared by emulsion polymerization of a reaction mixture consisting essentially of vinyl monomer in an aqueous solution of a non-ionic water-soluble polymer, in the presence of a cationic polymer, whereby to form a vinyl polymer from said vinyl monomer, said vinyl polymer having a cationic nitrogen content of from 0.004 to 0.2% by weight, based on said vinyl polymer.

2. A fabric sizing emulsion as claimed in claim 1 in which said reaction mixture is free of cationic substances, except for said cationic polymer.

3. A fabric sizing emulsion according to claim 1 in which said vinyl monomer is selected from the group consisting of vinyl acetate, vinyl butyrate, vinyl propionate, methyl acrylate, ethyl acrylate, butyl acrylate, methyl methacrylate, ethyl methacrylate, butyl methacrylate and mixtures thereof with styrene and ethylene, and the concentration of said vinyl monomer is 20 to 60% by weight, based on the weight of the emulsion; said non-ionic water-soluble polymer has a viscosity of from 3 to 500 centipoises measured at 20° C. with respect to a 1% aqueous solution and is selected from the group consisting of polyvinyl alcohol, hydroxyethylated starch, hydroxypropylated starch, hydroxyethyl cellulose and hydroxypropyl cellulose, and said cationic polymer has a viscosity of 5 to 1000 centipoises measured at 20° C. with respect to a 1% aqueous solution and is selected from the group consisting of cationic cellulose, cationic starch and cationic vinyl polymer.

4. A fabric sizing emulsion according to claim 3 in which said cationic polymer is a cationic vinyl polymer selected from the group consisting of a compound having the formula

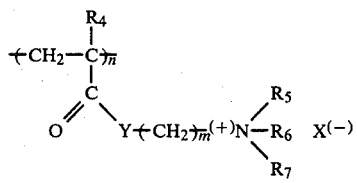

wherein $R_4$ is hydrogen or methyl, $R_5$, $R_6$ and $R_7$, which can be the same or different, are hydrogen, alkyl or substituted alkyl having 1 to 4 carbon atoms in the alkyl moiety, Y is oxygen or NH, m is an integer of from 1 to 10, and X is an anion, a compound having the formula

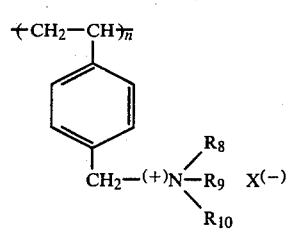

wherein $R_8$, $R_9$ and $R_{10}$, which can be the same or different, are hydrogen, alkyl or substituted alkyl having 1 to 2 carbon atoms in the alkyl moiety, and X is an anion, and a compound having the formula

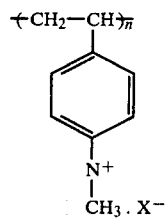

wherein X is an anion,
and the amount of said cationic vinyl polymer is from 0.01 to 5% by weight, based on the weight of the emulsion.

5. A fabric sizing emulsion according to claim 3 in which said cationic polymer is cationic starch or cationic cellulose having the formula

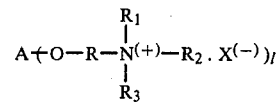

wherein A is a starch or cellulose radical, R is alkylene or hydroxyalkylene, $R_1$, $R_2$ and $R_3$, which can be the same or different, are alkyl, aryl or aralkyl or

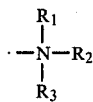

forms a heterocyclic ring, X is an anion and l is a positive integer, and wherein the degree of cation substitution is from 0.01 to 1, and wherein the amount of said cationic starch or cationic cellulose is from 0.1 to 5% by weight, based on the weight of the emulsion.

6. A fabric sizing emulsion according to claim 3 in which the amount of said vinyl monomer is from 25 to 50% by weight based on the weight of the emulsion; the amount of said cationic polymer is from 0.2 to 3.0% by weight, based on the weight of the emulsion.

7. A household starch composition according to claim 6 in which said vinyl monomer is vinyl acetate.

8. A fabric sizing emulsion as claimed in claim 7 wherein said cationic polymer is a cationic vinyl polymer having the formula:

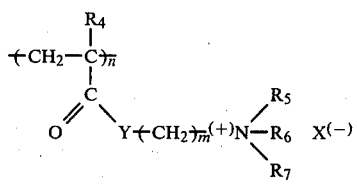

wherein $R_4$ is hydrogen or methyl, $R_5$, $R_6$ and $R_7$, which can be the same or different, are hydrogen or alkyl or substituted alkyl having 1 to 4 carbon atoms, Y is oxygen or —NH in the amide linkage, X is an anion, and m is an integer of from 1 to 10.

9. A fabric sizing emulsion as claimed in claim 7 wherein said cationic polymer is a cationic vinyl polymer having the formula:

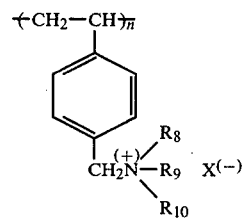

wherein $R_8$, $R_9$ and $R_{10}$, which can be the same or different, are hydrogen or alkyl or substituted alkyl having 1 to 2 carbon atoms and X is an anion.

10. A fabric sizing emulsion as claimed in claim 7 wherein said cationic polymer is a cationic vinyl polymer having the formula:

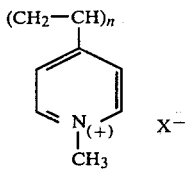

wherein X is an anion.

11. A fabric sizing emulsion as claimed in claim 1 wherein the content of the cationic nitrogen originating from the cationic polymer in the vinyl polymer is 0.01 to 0.15% by weight, based on the vinyl polymer.

12. A fabric sizing emulsion as claimed in claim 1 wherein the non-ionic water-soluble polymer is hydroxyethylated starch, hydroxypropylated starch, hydroxyethyl cellulose or hydroxypropyl cellulose.

13. A fabric sizing emulsion as claimed in claim 1 wherein the non-ionic water-soluble polymer is polyvinyl alcohol having a degree of saponification of 70 to 100%.

14. A fabric sizing emulsion as claimed in claim 1 wherein the vinyl polymer is one obtained by polymerizing monomeric vinyl acetate, monomeric methyl acrylate, monomeric methyl methacrylate or a mixture thereof or a mixture of such monomer with monomeric ethylene or monomeric styrene.

15. A fabric sizing emulsion as claimed in claim 1, in which the emulsion polymerization is using from 20 to 60 percent by weight, based on the total weight of the reaction mixture, of said vinyl monomer.

16. A fabric sizing emulsion as claimed in claim 1, in which the emulsion polymerization is conducted in the presence of a non-ionic surface active agent, as an emulsifier.

17. A fabric sizing emulsion as claimed in claim 16 in which said non-ionic surface active agent has an HLB value of at least 11 and is selected from the group consisting of polyoxyethylene alkyl ethers, polyoxyethylene alkylphenyl ethers and polyoxyethylene sorbitan fatty acid esters.

18. A fabric sizing emulsion as claimed in claim 1, wherein the emulsion polymerization reaction mixture further contains an additive or a mixture thereof selected from plasticizers, antifreezing agents, perfumes, fungicides, antiseptics, fluorescent dyes and pigments.

19. A fabric sizing emulsion prepared by emulsion polymerization, at a temperature of from 40° to 120° C., of a reaction mixture consisting of from 25 to 50% by weight of vinyl acetate, an aqueous solution of polyvinyl alcohol having the property that a 1% aqueous solution thereof has a viscosity of 3 to 500 centipoises, said solution containing from 0.1 to 1% by weight, based on the weight of the reaction mixture, of a pH buffer salt effective to maintain the pH of the reaction mixture at from 4 to 8, said solution also containing an effective emulsifying amount of a non-ionic surface active agent having an HLB value of from 13 to 18 and selected from the group consisting of polyoxyethylene alkyl ethers, polyoxyethylene alkylphenyl ethers and polyoxyethylene sorbitan fatty acid esters, said reaction mixture containing a polymerization initiator and cationic polymer selected from the group consisting of water-soluble cationic cellulose containing a quaternary ammonium cationic group and having a degree of cationic substitution of from 0.02 to 0.5, water-soluble cationic starch containing a quaternary ammonium cationic group and having a degree of cation substitution of from 0.02 to 0.5 and a cationic vinyl polymer, said reaction mixture containing from 0.2 to 3.0% by weight of said cationic polymer based on the weight of said emulsion, said cationic polymer having the property that a 1% aqueous solution thereof has a viscosity of from 5 to 1000 centipoises measured at 20° C., the emulsion polymerization being continued until a vinyl polymer of said vinyl acetate is formed wherein said vinyl polymer contains from 0.01 to 0.15% by weight, based on said vinyl polymer, of cationic nitrogen atoms supplied by said cationic polymer.

* * * * *